United States Patent [19]

Mora

[11] Patent Number: 4,813,721
[45] Date of Patent: Mar. 21, 1989

[54] APPARATUS FOR ADJUSTING THE INCLINATION OF A VEHICLE REAR SEAT

[75] Inventor: Gianfranco Mora, Turin, Italy

[73] Assignee: Fiat Auto S.p.A., Turin, Italy

[21] Appl. No.: 97,215

[22] Filed: Sep. 15, 1987

[30] Foreign Application Priority Data

Sep. 16, 1986 [IT] Italy .................. 53833/86[U]

[51] Int. Cl.$^4$ .............................................. B60N 1/02
[52] U.S. Cl. .................... 296/65.1; 297/343; 318/466
[58] Field of Search ............ 296/65 R; 297/340–343, 297/330; 318/466, 467; 307/9, 10 R

[56] References Cited

U.S. PATENT DOCUMENTS

| | | | |
|---|---|---|---|
| 2,725,921 | 12/1955 | Markin | 297/216 |
| 2,974,998 | 3/1961 | Himka | 296/65 R |
| 3,597,554 | 8/1971 | Siegel | 318/466 |
| 3,982,787 | 9/1976 | Moll | 297/317 |
| 4,404,632 | 9/1983 | Harada et al. | 318/466 |
| 4,463,426 | 7/1984 | Caddick et al. | 296/65 R |

FOREIGN PATENT DOCUMENTS

| | | |
|---|---|---|
| 2151969 | 4/1973 | Fed. Rep. of Germany . |
| 3331472 | 3/1985 | Fed. Rep. of Germany . |
| 2513195 | 3/1983 | France . |

OTHER PUBLICATIONS

Patent Abstracts of Japan, vol. 9, No. 25 (M-355) [1748], Feb. 2, 1985; and JP-A-59 171 725 (Nihon Hatsujiyou K.K.), 9/28/84.

*Primary Examiner*—Robert R. Song
*Attorney, Agent, or Firm*—Frost & Jacobs

[57] ABSTRACT

An apparatus for adjusting the inclination of a rear seat of a vehicle is described, of the type comprising an electromechanical linkage which is able to translationally move in one direction or the other the seat cushion assembly to which the back-rest is hinged, to thus vary the inclination of this latter, and first electrical control means for said linkage. The main characteristic of the present invention is that it comprises second electrical means which, when a door of the vehicle is opened, cause said cushion assembly to translate from the position which it assumed before the opening, to a withdrawn end-of-travel position in which the back-rest is lesserly inclined.

5 Claims, 2 Drawing Sheets

APPARATUS FOR ADJUSTING THE INCLINATION OF A VEHICLE REAR SEAT

BACKGROUND OF THE INVENTION

This invention relates to an apparatus for adjusting the inclination of a vehicle rear seat.

In some vehicles it is known to install rear seats which are inclinable, by comprising a cushion assembly and a back-rest which are hinged together in such a manner that on translationally moving the cushion assembly forwards or backwards, the back-rest varies its inclination. Currently, the translational movement of the cushion assembly is obtained by an advancement linkage comprising a motor controlled by a common switch. However, this adjustment system has the drawback that when the back-rest is reclined (with the cushion assembly advanced) it is difficult for the user to leave the vehicle.

SUMMARY OF THE INVENTION

The object of the present invention is to provide an apparatus for adjusting the inclination of a vehicle rear seat which is of simple construction while being free of the aforesaid drawback. Further objects and advantages of the present invention will be apparent from the description given hereinafter.

The present invention provides an apparatus for adjusting the inclination of a vehicle rear seat, of the type comprising an electromagnetic advancement linkage for the seat cushion assembly, to which is hinged a back-rest which when said cushion assembly undergoes translational movement varies its inclination relative to the cushion assembly between a minimum inclination corresponding to the most withdrawn position of said cushion assembly and a maximum inclination corresponding to the most advanced position of said cushion assembly. A first electrical control means is provided for said linkage, and the present invention is characterized by the provision of second electrical control means for said linkage, which are connected to an electrical energy source by way of a switch installed along the abutment frame for a door of said vehicle and are arranged to enable said linkage to be fed electrically with predetermined polarity such that when the door is opened, said cushion assembly translates towards its most withdrawn position.

BRIEF DESCRIPTION OF THE DRAWINGS

The present invention will be more apparent from the description of a preferred embodiment thereof given hereinafter by way of non-limiting example with reference to the accompanying drawings, in which.

DETAILED DESCRIPTION OF THE INVENTION

Figure 1:
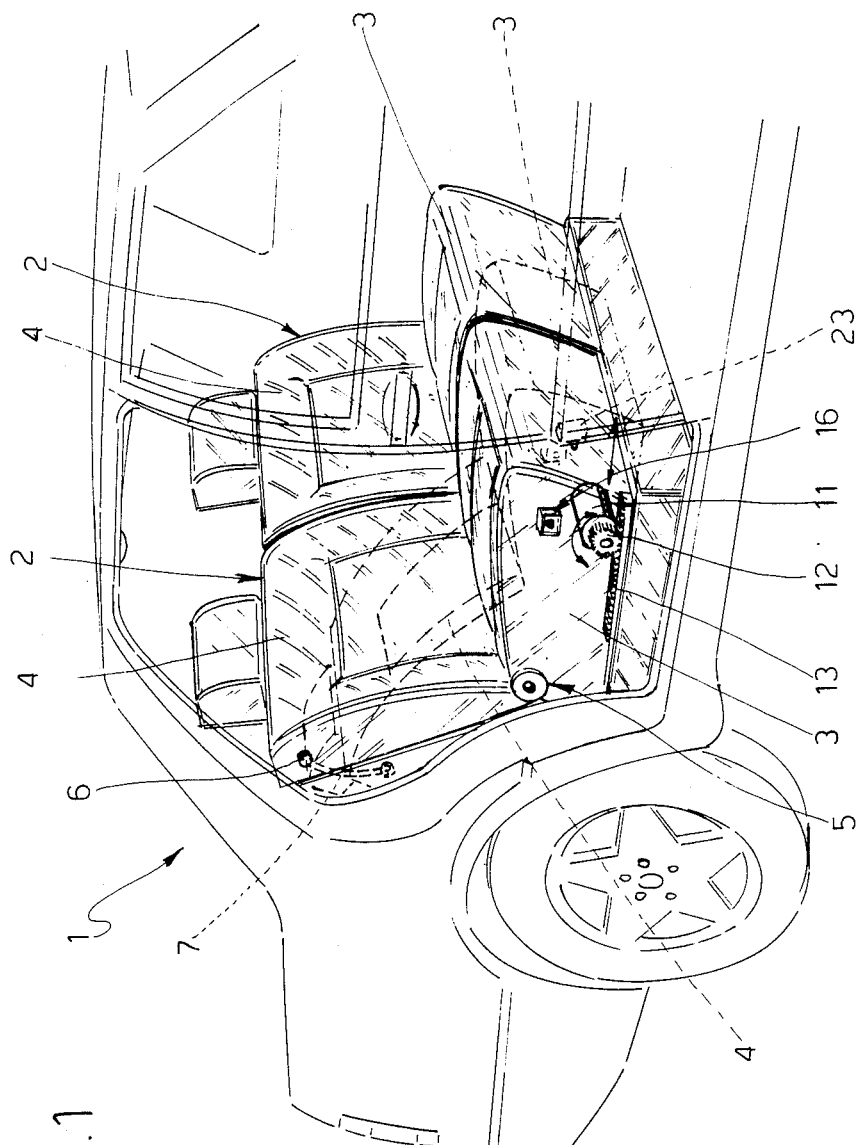
FIG. 1 is a perspective view of the rear part of a vehicle in which an apparatus constructed in accordance with the present invention is installed.

In FIG. 1, the reference numeral 1 indicates overall an automobile comprising two separate inclinable rear seats 2 each having a cushion assembly 3 and a back-rest 4. These are hinged together in such a manner that when the cushion assembly 3 is moved translationally, the back-rest 4 varies its inclination. For this purpose, each seat 2 is provided with hinge means of known type between the cushion assembly 3 and back-rest 4, and the back-rest is provided in its upper part with an external pin 6 arranged to slide along a guide 7 shown by dashed lines and supported by the frame of the automobile 1. The guide 7 is arched so that during the translation of the cushion assembly 3, the pin 6 slides parallel to itself along a trajectory which is substantially rectilinear and orthogonal to the floor of the automobile 1.

It is however apparent that the aforesaid mechanism can be constructed in any other manner.

Figure 2:
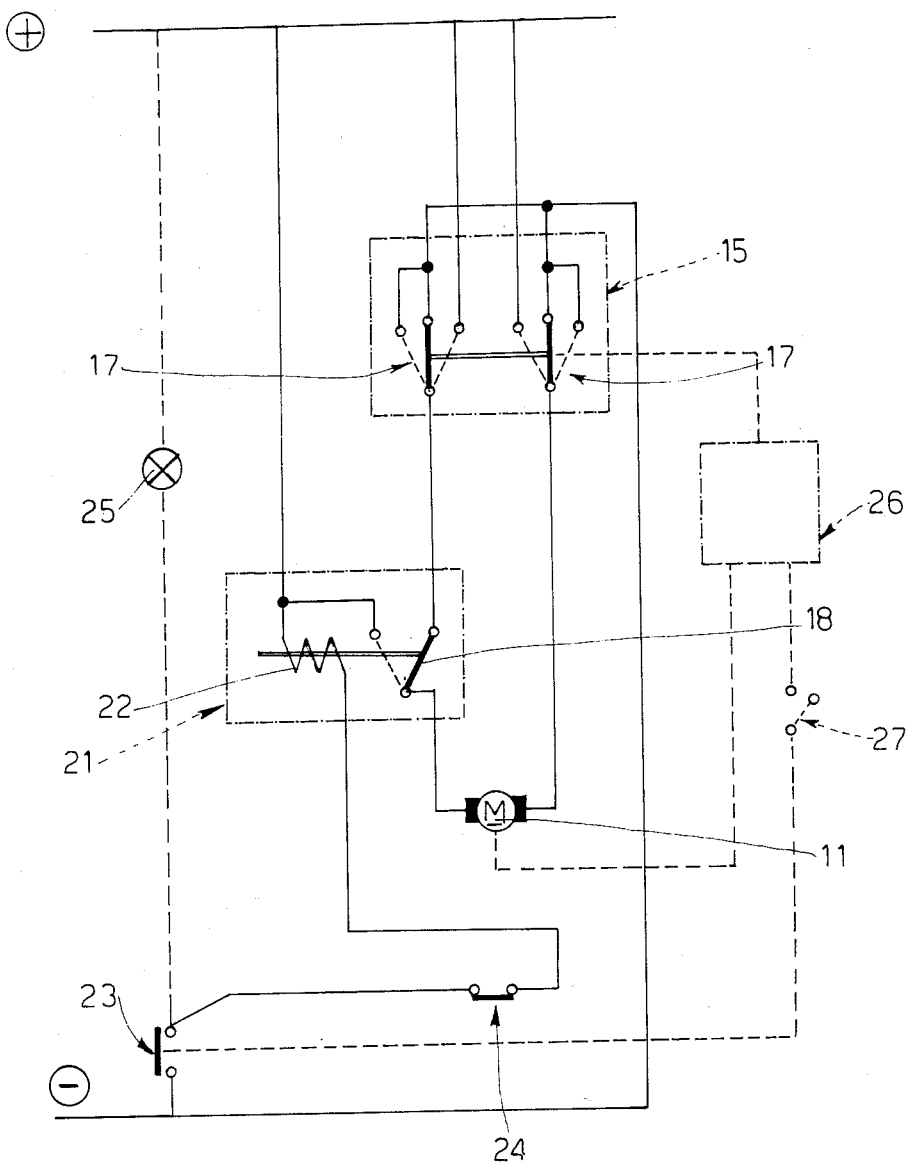
FIG. 2 is an electrical schematic diagram of the apparatus of FIG. 1.

With reference to FIGS. 1 and 2, each seat 2 is provided with an apparatus by which the cushion assembly 3 can be moved translationally in one direction or the other to consequently vary the inclination of the back-rest 4, and by which on opening the door corresponding to the cushion assembly 3, the back-rest is returned automatically to its most erect position to enable the user to leave or enter the automobile 1 comfortably. The apparatus is provided with an electromechanical advancement linkage comprising an electric motor 11, on the output shaft of which there is keyed a gear wheel 12 engaged with a rack 13 fixed to that part of the floor comprising the guides along which the cushion assembly 3 is made to translate. The motor 11 is rigidly connected to the cushion assembly so that during its operation, by virtue of the engagement between the gear wheel 12 and rack 13, it translates parallel to itself and drags the cushion assembly 3 with it.

As shown in FIG. 2, the apparatus of the invention comprises a switch block 15 of known type provided with a pushbutton control 16 also of known type, such as a rocker pushbutton, enabling the motor 11 to be fed under reversible polarity from an electrical energy source, for example the battery of the automobile 1, in order to cause the output shaft of this motor to rotate in one direction or the other. The switch block 15 is of double type, and thus comprises two change-over switches 17, their mobile switching members being rigid with each other and of which one is connected directly to the motor 11 and the other is connected to the motor by way of the armature 18, when in its rest position, of an electromagnetic relay 21 comprising a coil 22 connected to the energy source by a switch 23, of the known pushbutton type used for the courtesy lights, installed along the door abutment frame. The switch 23 is open when the door is closed and vice versa.

In the conductor connecting the coil 22 to the switch 23 there is installed a normally closed microswitch 24 which is opened by the motor 11 when it reaches its limiting position in which the seat 2 is in its end-of-travel position, and consequently the seat 2 is in its most erect position. The switch 23 is also connected into the feed conductor of an internal lamp 25 of the automobile 1, which is thus fed when the door is open to form the automobile courtesy light.

The control 16 is installed inside the automobile 1 in a zone accessible by the user, and could for example be carried by the cushion assembly 3 in one of its side portions as shown in FIG. 1.

With reference to FIG. 2, the apparatus can optionally also comprise a central electronic unit 26 (shown by dashed and dotted lines) of known type provided with a sensor of known type, and thus not shown for simplicity, which is arranged to verify the opening or closure of the switch 23. The central unit 26 is connected to a sensor, not shown, which verifies the position of the motor 11 along the rack 13 on opening the door of the automobile 1, and is connected to the switch block 15. The member which verifies the position of the motor 11 is of known type, and is in the form for example of a common position sensor such as an encoder.

In use, with the door closed, the output shaft of the motor 11 can be rotated in one direction or the other by the control 16, making it possible to cause the cushion assembly 3 to move translationally in order to set the inclination of the back-rest 4 in accordance with one of the many positions which the cushion assembly 3 can assume between its most withdrawn end-of-travel position with the back-rest 4 at minimum inclination, and its most advanced position with the back-rest 4 at maximum inclination. On opening the door of the automobile 1, the switch 23 is closed to feed the coil 22 of the relay 21, which retracts the armature 18, which becomes connected to one pole of the electrical energy source. The motor 11 becomes fed by way of the armature 18 at a polarity such as to move the cushion assembly 3 from its current position to its most withdrawn position, to cause the back-rest 4 to assume its most erect position. In this position, the switch 24 opens to interrupt electrical feed to the coil 22, so releasing the armature 18 which returns to its original position, to stop the motor 11.

Thus on opening the door of the automobile 1, the seat 2 passes automatically (and thus without any action by the user) from the position in which it currently lies to its most erect position. The central unit 26, if present, is provided with a memory register which memorises the current position of the motor 11 along the rack 13 and thus the position which the seat 2 occupies before opening the door. By this means, when the user re-enters the automobile 1, and provided a switch 27 has not been operated to deactivate the central unit 26, it latter by means of an actuator of known type (not shown) causes the switch block 15 to operate, to feed electrical energy to the motor 11 until the seat 2 reassumes the position which it occupied before opening the door.

The advantages obtained with the present invention are apparent from the aforegoing.

In particular, the user need only set with the control 15 the position which he wishes the seat 2 to assume. The other operations, for facilitating the entry and exit of the user into and from the automobile, are effected automatically by the apparatus by merely opening or closing the door of the automobile 1.

Moreover, the apparatus is of simple construction and thus of low production cost.

Finally, modification can be made to the apparatus described and illustrated herein but without leaving the protective scope of the present invention.

In particular, the apparatus could lack the relay 21, and the action which this performs (electrically feeding the motor 11 following opening of the door to return the seat 2 to its most erect position) could be performed by the central unit 26 by providing it with a sensor arranged to verify closure of the switch 23, to consequently enable the motor 11 to be electrically fed by way of the switch block 15. In addition, the advancement linkages for the cushion assembly 3 can be different from those described.

Finally, the apparatus of the invention could also be installed, but as a single unit, in automobiles provided with a single rear seat. In this application, the switches 23 installed along the abutment frames of the two rear doors must be connected in parallel.

I claim:

1. An apparatus for adjusting the inclination of a rear seat (2) of a vehicle (1), of the type comprising an electromagnetic advancement linkage (11, 12 and 13) for the seat cushion assembly (3), to which is hinged a back-rest (4) which, when said cushion assembly (3) undergoes translational movement, varies its inclination relative to said cushion assembly (3) between a minimum inclination corresponding to the most withdrawn position of said cushion assembly (3) and a maximum inclination corresponding to the most advanced position of said cushion assembly (3), a first electrical control means comprising a switch block (15) provided with a control member (16) arranged to enable said linkage (11, 12 and 13) to be fed electrically with reversible polarity to cause said cushion assembly (3) to translate in one direction or the other; said switch block (15) comprising two change-over switches (17) having their mobile switching members rigid with each other, with one of said switches connected directly to said linkage (11, 12 and 13) and the other of said switches being connected to said linkage (11, 12 and 13) by a second electrical control means (21), said second electrical control means (21) being connected to an electrical energy source by a switch (23) installed along the abutment frame for a door of said vehicle (1) and arranged to enable said linkage (11, 12 and 13) to be fed electrically with predetermined polarity such that when the door is opened, said cushion assembly (3) translates towards its most withdrawn position.

2. An apparatus as claimed in claim 1, characterized in that said second means comprise a relay (21) with a coil (22) connected to said source by way of said switch (23), and an armature (18) which when in its rest position connects one of said change-over switches (17) to said linkage (11, 12 and 13); said armature (18) being arranged, when said coil (22) is fed by way of said switch (23), to connect said linkage (11, 12 and 13) to a predetermined pole of said source such as to cause the motor (11) of said linkage to rotate in a direction which moves said cushion assembly towards its withdrawn position.

3. An apparatus as claimed in claim 1, characterized by comprising a central electrical unit (26) provided with a position sensor arranged to verify, by way of said linkage (11, 12 and 13), the position assumed by said cushion asembly (3) before the opening of the door, a memory register arranged to memorize said position, a first sensor arranged to verify the closure of the door and thus the opening of said switch (23), and a second sensor arranged to operate said first control means (15) in a manner to cause said linkage (11, 12 and 13) to be fed electrically at a predetermined polarity, whereby, when the door is closed, to return said cushion assembly (3) into the position which it assumed before the opening of the door.

4. An apparatus as claimed in claim 1, characterized in that a normally closed second switch (24) is connected into the electrical feed line of said second means (21) and is opened by a member of said linkage (11, 12 and 13) when said cushion assembly (3) assumes its most withdrawn position.

5. An apparatus as claimed in claim 1, characterized in that said linkage comprises an electric motor (11), on the output shaft of which there is keyed a gear wheel (12) engaging a fixed rack (13); said motor (11) being rigid with said cushion assembly (3) in such a manner that when it translates it drags said cushion assembly with it.

* * * * *